United States Patent
Song et al.

(10) Patent No.: US 10,929,674 B2
(45) Date of Patent: Feb. 23, 2021

(54) DUAL STAGE ATTENTION BASED RECURRENT NEURAL NETWORK FOR TIME SERIES PREDICTION

(71) Applicant: NEC Laboratories America, Inc., Princeton, NJ (US)

(72) Inventors: Dongjin Song, La Jolla, CA (US); Haifeng Chen, West Windsor, NJ (US); Guofei Jiang, Princeton, NJ (US); Yao Qin, Princeton, NJ (US)

(73) Assignee: NEC CORPORATION

( * ) Notice: Subject to any disclaimer, the term of this patent is extended or adjusted under 35 U.S.C. 154(b) by 846 days.

(21) Appl. No.: 15/688,094

(22) Filed: Aug. 28, 2017

(65) Prior Publication Data

US 2018/0060665 A1     Mar. 1, 2018

Related U.S. Application Data

(60) Provisional application No. 62/380,627, filed on Aug. 29, 2016, provisional application No. 62/384,790, filed on Sep. 8, 2016.

(51) Int. Cl.
| | |
|---|---|
| *G06N 20/00* | (2019.01) |
| *G06K 9/00* | (2006.01) |
| *G06F 17/18* | (2006.01) |
| *G08B 31/00* | (2006.01) |
| *G06N 3/04* | (2006.01) |
| *G06N 3/08* | (2006.01) |
| *G06K 9/62* | (2006.01) |

(Continued)

(52) U.S. Cl.
CPC ......... *G06K 9/00718* (2013.01); *G06F 17/18* (2013.01); *G06K 9/00744* (2013.01); *G06K 9/6271* (2013.01); *G06N 3/04* (2013.01); *G06N 3/0445* (2013.01); *G06N 3/0454* (2013.01); *G06N 3/084* (2013.01); *G06N 20/00* (2019.01); *G08B 23/00* (2013.01); *G08B 31/00* (2013.01); *G06F 16/2423* (2019.01); *G06K 2009/00738* (2013.01); *G06N 3/02* (2013.01); *G06N 3/049* (2013.01); *G06Q 10/06375* (2013.01); *G06T 2207/20084* (2013.01)

(58) Field of Classification Search
None
See application file for complete search history.

(56) References Cited

PUBLICATIONS

Yao et al, "Describing Videos by Exploiting Temporal Structure", Oct. 2015, arXiv, all pages (Year: 2015).*

(Continued)

*Primary Examiner* — Daniel C Puentes
(74) *Attorney, Agent, or Firm* — Joseph Kolodka (57) ABSTRACT

Systems and methods for time series prediction are described. The systems and methods include encoding driving series into encoded hidden states, the encoding including adaptively prioritizing driving series at each timestamp using input attention, the driving series including data sequences collected from sensors. The systems and methods further includes decoding the encoded hidden states to generate a predicting model, the decoding including adaptively prioritizing encoded hidden states using temporal attention. The systems and methods further include generating predictions of future events using the predicting model based on the data sequences. The systems and methods further include generating signals for initiating an action to devices based on the predictions.

20 Claims, 7 Drawing Sheets

(51) Int. Cl.
  *G08B 23/00* (2006.01)
  *G06Q 10/06* (2012.01)
  *G06N 3/02* (2006.01)
  *G06F 16/242* (2019.01)

(56) References Cited

PUBLICATIONS

Wu et al, "Action Recognition with Joint Attention on Multi-Level Deep Features", Jul. 2016, arXiv, all pages (Year: 2016).*
Lea et al., "Temporal Convolutional Networks: A Unified Approach to Action Segmentation", 2016, Springer International Publishing, all pages (Year: 2016).*
Chen, "Narx-Based Nonlinear System Identification Using Orthogonal Least Squares Basis Hunting", IEEE Transactions on Control Systems Technology, Jan. 2008, vol. 16, No. 1, pp. 78-84.
Cho, "On the Properties of Neural Machines Translation: Encoder-Decoder Approaches", Proceedings of SSST-8, Eight Workshop on Syntax, Semantics and Structure in Statistical Translation, Oct. 2014, pp. 103-111.
Cho, "Learning Phrase Representations Using RNN Encoder-Decoder for Statistical Machine Translation", Conference on Empirical Methods in Natural Language Processing, Sep. 2014, pp. 1-15.
Diaconescu, "The Use of NARX Neural Networks to Predict Chaotic Time Series", WSEA Transactions on Computer Research, Issue 3, vol. 3, Mar. 2008, pp. 182-191.
Qin, "A Dual Stage Attention based Recurrent Neural Network", International Joint Conference on Artificial Intelligence (IJCAI), 2017, pp. 1-7.

* cited by examiner

DUAL STAGE ATTENTION BASED RECURRENT NEURAL NETWORK FOR TIME SERIES PREDICTION

RELATED APPLICATION INFORMATION

This application claims priority to 62/380,627, filed on Aug. 29, 2016, incorporated herein by reference in its entirety, and 62/384,790, filed on Sep. 8, 2016, incorporated herein by reference in its entirety. This application is related to an application entitled "VIDEO SYSTEM USING DUAL STAGE ATTENTION BASED RECURRENT NEURAL NETWORK FOR FUTURE EVENT PREDICTION", and which is incorporated by reference herein in its entirety.

BACKGROUND

Technical Field

The present invention relates to systems and methods for time series prediction and more particularly for systems and methods for a dual-stage attention-based recurrent neural network for time series prediction.

Description of the Related Art

Multivariate time series prediction is a field of endeavor that can benefit many real world application, such as financial market prediction, medical diagnosis, weather forecasting, communication network traffic forecasting, machine translation, speech recognition and others. However, many of these applications cannot be properly modeled with linear techniques such as autoregressive moving-average (ARMA) or autoregressive integrated moving average (ARIMA) models because they do not exhibit simple regularities in temporal variations. Nor can conventional models differentiate among exogenous (driving) input terms.

However, efforts to develop non-linear autoregressive exogenous (NARX) models have so far proven ineffective at properly modelling complex data sets. In particular, previous efforts have been unable to solve two main challenges of NARX modelling; (1) selecting the relevant driving series for making predictions (especially for a large number of driving series), and (2) capturing the temporal dependencies, particularly in systems having long range dependencies. Because the encoder reads inputs into fixed length vectors, performance of the RNN will degrade as input lengths increase.

SUMMARY

According to an aspect of the present principles, a method for time series prediction. The method includes encoding a plurality of driving series into a plurality of encoded hidden states, the encoding including adaptively prioritizing driving series at each of a plurality of timestamps using input attention, the plurality of driving series including data sequences collected from one or more sensors. The method further includes decoding the plurality of encoded hidden states to generate a predicting model, the decoding including adaptively prioritizing encoded hidden states using temporal attention. The method further includes generating predictions of one or more future events using the predicting model based on the data sequences. The method further includes generating a signal for initiating an action to at least one device based on the predictions.

According to another aspect of the present principles, a system is provided for a system for time series prediction. The system includes at least one imaging sensor configured to capture one or more video sequences. An encoder is configured to encode a plurality of driving series into a plurality of encoded hidden state using an input attention mechanism configured to adaptively prioritize driving series at each of a plurality of timestamps, wherein the plurality of driving series includes the video sequences. A decoder is configured to decode the at least one encoded hidden state with a non-linear activation function to predict a future state using a temporal attention mechanism configured to adaptively prioritize encoded hidden states. A computer processor is configured to generate predictions of one or more future events based on the encoding and decoding of the video sequences, and generate a signal for initiating an action to at least one device based on the predictions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for the accurate approximation of time series prediction with multivariate time series having exogenous driving input series. In one embodiment, a dual-stage attention based recurrent neural network (DA-RNN) is described. The DA-RNN offers improved performance over conventional non-linear autoregressive exogenous models for long term time series by better capturing long term temporal dependencies, building more accurate models, and resisting noise. This improvement may be achieved by including a two stage structure wherein the first stage is an encoder stage and the second stage is a decoder stage.

The encoder of the DA-RNN in accordance with the present embodiment, can include an input attention mechanism before encoding. The input attention mechanism may take the form of a multilayer perceptron, or other suitable attention mechanism. By including an input attention mechanism in the encoder stage of the DA-RNN of the present embodiment, the DA-RNN can adaptively prioritize particular relevant input features at each timestamp that have greater effect on accurate prediction, rather than giving the same importance to all of the input features.

Data processed by the input attention mechanism of the DA-RNN is then encoded and passed to a temporal attention mechanism before decoding. The temporal attention mechanism may be employed to concurrently select relevant encoded data across all previous timestamps. The output of the temporal attention mechanism may then be decoded and used to generate the predicted output.

The two stage DA-RNN may be jointly trained end-to-end with backpropagation. Through training, the dual attention structure in accordance with the aspects of the present invention, is able to capture long-term dependencies and adaptively select the most relevant input features for making predictions, thus enabling more accurate predictions that are easy to interpret and robust to noise.

For example, the DA-RNN may be employed within a computing system to forecast weather behavior based on known weather data by extracting relevant weather data, encoding that weather data, and then re-extracting and decoding the encoded data to produce a model. The model will correlate the known weather data to weather behavior, thus enabling predictions of future weather behavior. Similarly, the DA-RNN could be used in a computer system for forecasting financial markets where the DA-RNN will produce a model correlating, for example, economic data with stock behavior, thus enabling the prediction of stock prices.

Because of the two attention mechanisms, the computing system described above will be able to automatically place more importance on relevant data, and less importance on irrelevant data, resulting in an improvement in the quality of the data. The input attention can prioritize the most relevant types of data, while the temporal attention can prioritize the most relevant times for which data is provided. By introducing attention mechanisms to the learning and modeling processes, the computing system can generate more parameters from a given data set than other neural networks for more complex processing of the data. Accordingly, the system can filter out noise more effectively, and generate more accurate models for prediction. All of these improvements may result from introducing the input and temporal attention capabilities to the computing system.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
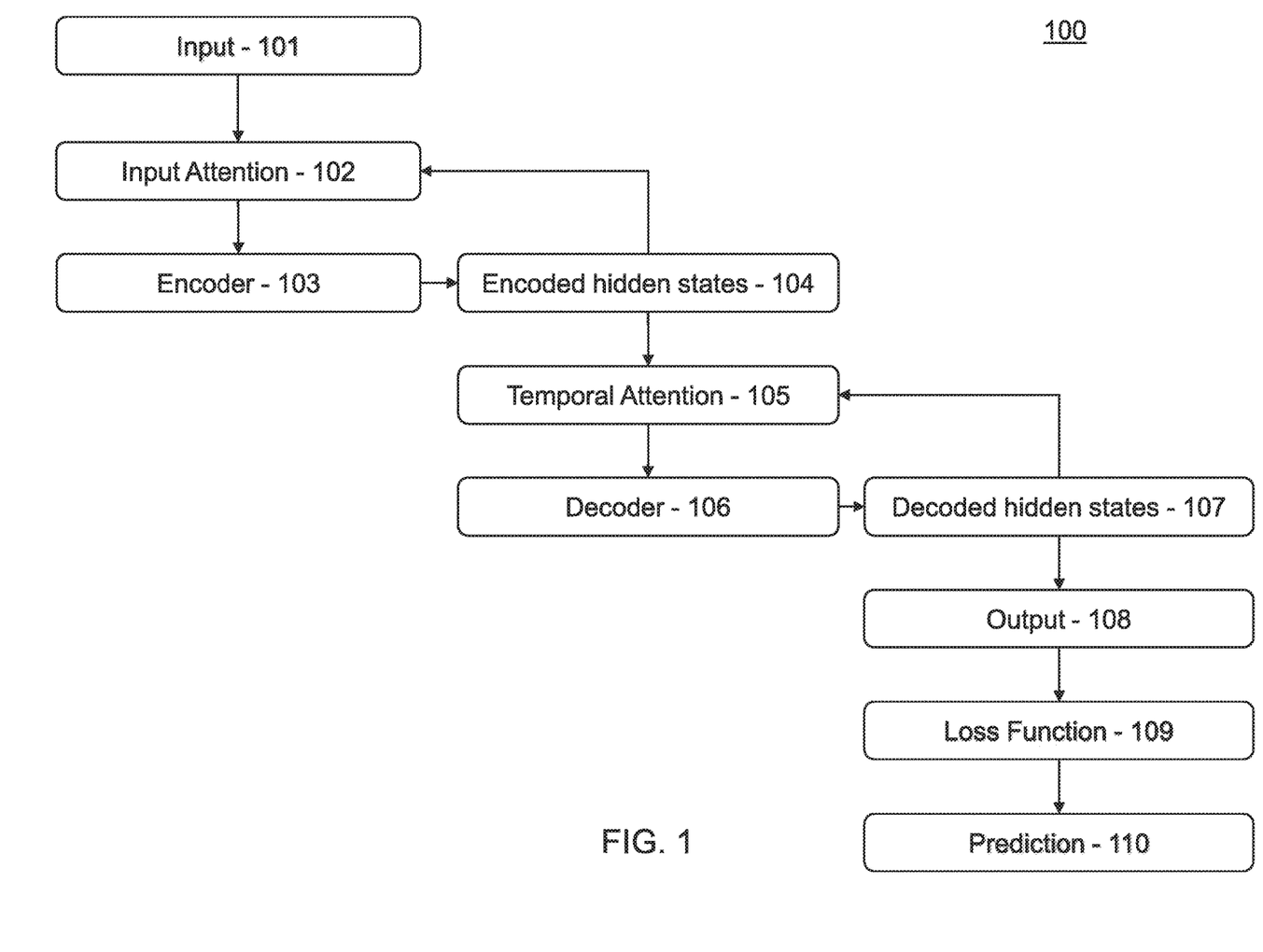
FIG. 1 is a block/flow diagram illustrating a high-level method for a dual-stage attention-based recurrent neural network, in accordance with the present principles.

Referring now in detail to the figures in which like numerals represent the same or similar elements and initially to FIG. 1, a high-level method for dual-stage attention based neural networks is illustratively depicted in accordance with one embodiment of the present principles.

In one embodiment, a dual-stage attention-based recurrent neural network (DA-RNN) 100 includes an input 101. In one embodiment, the input 101 includes time series data including at least one driving series. The driving series represents time series data of multiple types (e.g. data for each of a variety of weather conditions, or data corresponding to each of a plurality of subjects and objects depicted in a video sequence). Each driving series includes at least one input feature. An input feature may represent a given data point at a given point in time (eg, the temperature on a particular day or the month, or a position of a person at a particular time in a video sequence). Each driving series may of the input 101 may include a plurality of input features for across a time period, with a given time denoted by a timestamp t. Other examples of possible time series data for use by the DA-RNN 100 may include stock market data, speech data, written language data for machine translation, medical data, communication network traffic data, and any other suitable data.

The DA-RNN 100 processes the input 101 with an input attention mechanism 102 to weight input features before encoding into encoded hidden states 104, where hidden states represent an intermediary stage in the processing of the data. The input attention mechanism 102 may be hardware or software configured to weight the input features by adaptively extract relevant driving series at each timestamp before encoding, thus prioritizing more types of data that is more relevant to the prediction. To accomplish the extraction, the input attention mechanism 102 evaluates the feature at a given timestamp of the input 101 and a hidden state 104 generated at a previous timestamp.

The selected relevant driving series are then provided to the encoder 103 which may encode the extracted driving series with a Long Short-Term Memory unit (LSTM), Gated Recurrent Unit (GRU) or other suitable model. The encoded extracted driving series forms the encoded hidden state 104 for the current timestamp. The encoded hidden states 104 include encoded information that may be used to affect subsequent hidden states 104 in time, and may be passed to the decoder 106 for producing an output.

The encoded hidden states 104 at all timestamps may be provided to a temporal attention mechanism 105. The temporal attention mechanism 105 then extracts relevant encoded hidden states 104 concurrently across all timestamps. Thus the most timestamps that are more relevant to the prediction are prioritized. The extraction is a function of all of the encoded hidden states 104 as well as a decoded hidden state 107 of a previous timestamp.

The extracted encoded hidden states 104 are then provided to a decoder 106 which decodes the extracted encoded hidden states 104 into decoded hidden states 107. The decoding is a function of a decoded hidden states 107 from a previous timestamp, an output from a previous timestamp and the extracted encoded hidden states 104. The decoding may be computed with a function including an LSTM, GRU or other suitable model.

An output 108 is generated from the decoded hidden states 107. The output 108 may be stored in memory or provided to a loss function 109 to be optimized. The loss function 109 may include a mean square error function or other suitable error function. The final output from the loss function may take the form of a prediction 110 and may be stored in memory or displayed to a user. The prediction may be, for example, a future weather behavior such as a storm or a tornado based on the input weather conditions, or the future occurrence of a hazard such as a fire based on the actions of the objects in the video sequence.

Figure 2:
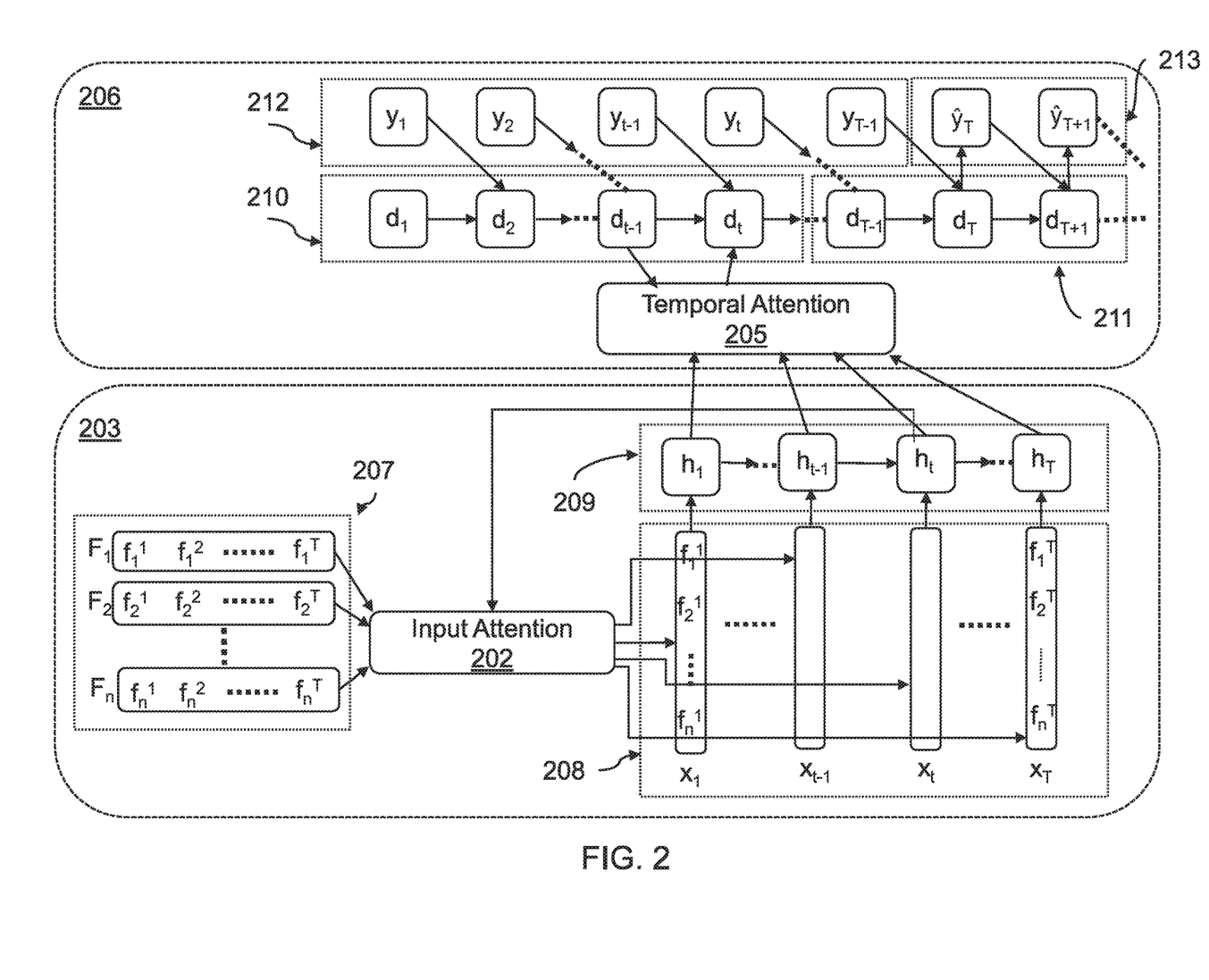
FIG. 2 is a flow diagram illustrating a method for a dual-stage attention-based recurrent neural network, in accordance with the present principles.

Referring now to FIG. 2, a method for a dual-stage attention-based recurrent neural network is illustratively depicted in accordance with an embodiment of the present principles.

The DA-RNN of the present embodiment may approximate a non-linear function F for, as an example, forecasting weather based on weather condition history or predicting hazards based on video data, using a recurrent neural network including an encoder 203 and a decoder 206, modeling a relationship between driving series 207 with known output 212. The encoder 203 encodes hidden states 209 from driving series 207, and the decoder 206 decodes the encoded hidden states 209 to generate decoded hidden states 210. The decoded hidden states 213 may generate predicted outputs 213.

The encoder 203 generates encoded hidden states 209 as an intermediary stage of the DA-RNN by employing at least an input attention mechanism 202. The input attention mechanism 202 adaptively extracts relevant input features of the driving series 207 to produce extracted feature series 208 at each timestamp of the series (1 through T, where t signifies an arbitrary timestamp and T signifies the last timestamp of the input series). A given extracted feature series may take the form of a vector containing a variety of data at a given timestamp, such as each type of weather data on a particular day, or each object in a video sequence at a particular moment in time. To generate an extracted feature series 208 at a current timestamp $x_t$, the input attention mechanism 202 refers to an encoded hidden state 209 of a previous timestamp $h_{t-1}$ (where t−1 is the timestamp immediately prior to the arbitrary timestamp) and each input feature of the current timestamp in each driving series 207 ($f_1^t$ through $f_n^t$). The encoder 203 may then encode the extracted feature series 208 of the current timestamp to generate an encoded hidden state 209 for the current timestamp $h_t$.

The decoder 206 generates a predicted output 213 by decoding encoded hidden states 209 to decoded hidden states 210. The decoder employs a temporal attention mechanism 205 which adaptively extracts relevant encoded hidden states 209 to generate each decoded hidden state 210. The decoded hidden state 210 may be an intermediary stage of the decoder that a user will not observe but is used to determine a prediction.

The temporal attention mechanism 205 extracts encoded hidden states 209 across all timestamps by referencing a decoded hidden state 210 of the previous timestamp $d_{t-1}$. The decoder 206 may then decode the extracted encoded hidden states 209 to generate a decoded hidden state 210 for the current timestamp $d_t$ by referring to a known output 212 or a predicted output 213 from the previous timestamp $y_{t-1}$ as well as the decoded hidden state 210 of the previous timestamp $d_{t-1}$. The decoder may generate a predicted decoded hidden state 211 for a future timestamp $d_T$ through this process. The predicted decoded hidden state 211 may predict a predicted output 213 for the future timestamp $\hat{y}_T$ by referring to a known output 212 or predicted output 213 from a previous timestamp $y_{T-1}$. The predicted output 213 may be, for example, a predicted weather pattern or condition, such as a storm or a tornado, or it could be a prediction of a particular hazard occurring such as a fire.

Accordingly, the DA-RNN of the present embodiment may utilize an encoder and decoder with dual attention mechanisms to estimate a non-linear, multivariate model for making time-series predictions.

Figure 3:
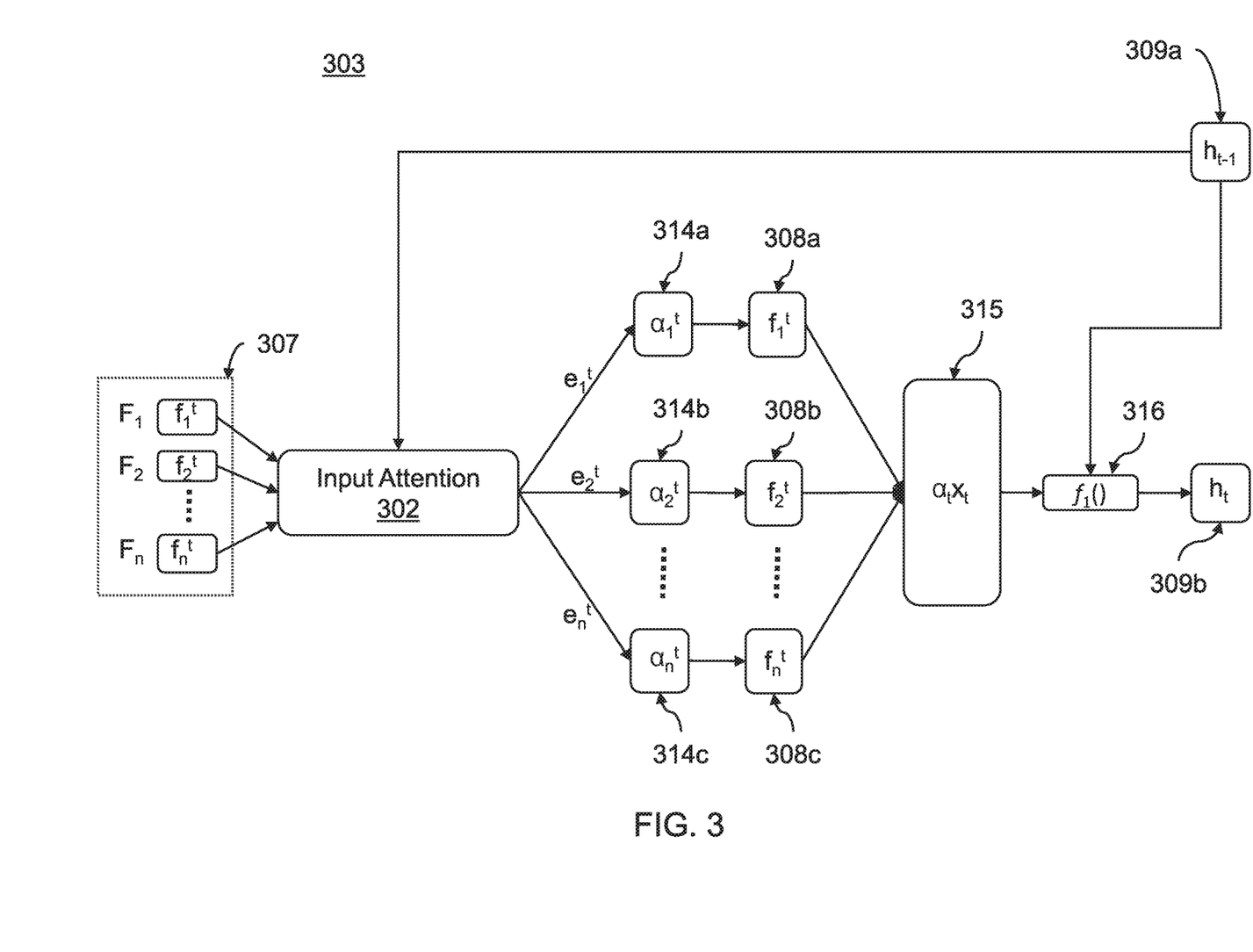
FIG. 3 is a flow diagram illustrating a method for encoding input in the encoder of a dual-stage attention-based recurrent neural network, in accordance with the present principles.

Referring now to FIG. 3, a method for encoding input in the encoder of a dual-stage attention-based recurrent neural network is illustratively depicted in accordance with an embodiment of the present principles.

The encoder 303 of the present embodiment determines an encoded hidden state 309b of a current timestamp t from input features of the current timestamp t of the driving series 307. The input attention mechanism 302 extracts relevant features by computing attention weights 314a, 314b and 314c corresponding to importance of each input feature at the current timestamp t (see, Formula 2 below). The encoder 303 applies the attention weights 314a, 314b and 314c to the input features 308a, 308b and 308c respectively, thus generating an adaptively extracted feature series 315. The adaptively extracted feature series 315 may then be encoded with a non-linear activation function 316 to generate the encoded hidden state 309b.

To determine the attention weights 314a-c, the input attention mechanism 302 may reference the input features of the driving series 307 and an encoded hidden state from a previous timestamp (t−1) 309a. The input attention mechanism 302 may be a feed forward network, which enables joint training of hidden states with other components of the RNN. Additionally, the input attention mechanism 302 may include a deterministic attention model, such as a multilayer perceptron to first calculate an unnormalized attention factor $e_k^t$ for each input feature $f_n^t$, according to formula (1) below:

$$e_n^t = v_e^T \tanh(W_e h_{t-1} + U_e x^k)$$ Formula (1)

where t is the current timestamp, k denotes the number of the driving series 307 (i.e., feature $f_1^t$ from series $F_1$), and $v_e$, $W_e$ and $U_e$ are parameters to learn. By applying a softmax function to $e_k^t$, such as that of Formula (2), an attention weight 314a-c is determined for each input feature 308a-c.

$$\alpha_k^t = \frac{\exp(e_t^k)}{\sum_{i=1}^{n} \exp(e_t^i)}$$ Formula (2)

The softmax function of formula (2) ensures that the sum of the attention weights for a given timestamp 314a-c is equal to one, thus normalizing each unnormalized attention factor $e_k^t$. The attention weights 314a-c may then be applied to each of the corresponding input features 308a-c, respectively, to generate an extracted feature series vector 315.

The encoder 303 applies a non-linear activation function 316, such as LSTM or GRU that refers to the extracted feature series vector 315 as well as the encoded hidden state from the previous timestamp 309a. The non-linear activation function 316 thus generates an encoded hidden state for the current timestamp 309b.

Figure 4:
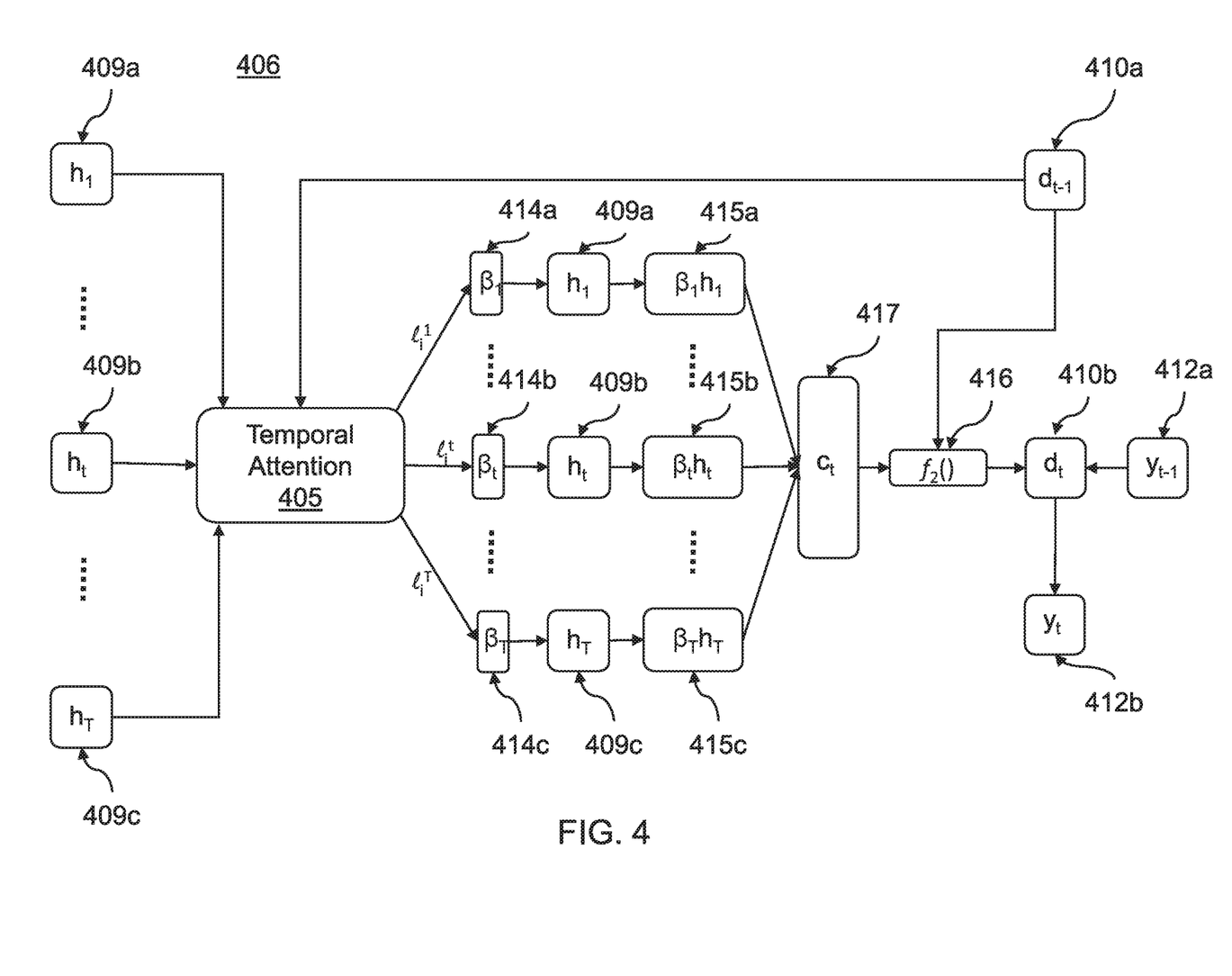
FIG. 4 is a flow diagram illustrating a method for decoding selected input in the decoder of a dual-stage attention-based recurrent neural network, in accordance with the present principles.

Referring now to FIG. 4, a method for decoding extracted input by the decoder of a dual-stage attention-based recurrent neural network is illustratively depicted in accordance with an embodiment of the present principles.

The decoder 406 of the present embodiment determines an output of a current timestamp (t) 412b from a decoded hidden state of the current timestamp (t) 410b from encoded hidden states across all timestamps 409a-c. The temporal attention mechanism 405 extracts relevant encoded hidden states 409a-c by computing temporal attention weights 414a, 414b and 414c corresponding to importance of each encoded hidden state 409a-c respectively. The decoder 405 applies the temporal attention weights 414a-c to each encoded hidden state 409a-c respectively, thus generating an adaptively extracted context vector 417. The context vector 417 may then be decoded with a non-linear activation function 416 to generate the decoded hidden state 410b, which is used to generate the output 412b. The output 412b may be a known output or a predicted output.

To determine the temporal attention weights 414a-c, the temporal attention mechanism 405 refers to the encoded hidden states 409a-c across all timestamps and a decoded hidden state from a previous timestamp (t−1) 410a. The temporal attention mechanism 405 may be a feed forward network, which enables joint training of hidden states with other components of the RNN. Additionally, the temporal attention mechanism 405 may include a deterministic attention model, such as a multilayer perceptron. The temporal attention mechanism 405 may first calculate an unnormalized attention factor $l_k^t$ for each encoded hidden state 409a-c, according to formula (3) below:

$$l_i^t = v_d^T \tanh(W_d d_{t-1} + U_d h^i)$$ Formula (3)

where t refers to the timestamp, i refers to the referenced encoded hidden state 409a-c, and $v_d$, $W_d$ and $U_d$ are parameters to learn. By applying a softmax function to $l_k^t$, such as that of Formula (4), the temporal attention weights 414a-c is determined for each encoded hidden state 409a-c.

$$\beta_i^t = \frac{\exp(l_i^t)}{\sum_{j=1}^{n} \exp(l_j^t)}$$ Formula (4)

The temporal attention weights 414a-c are then applied to the encoded hidden states 409a-c to produce weighted encoded hidden states 415a-c.

A context vector 417 is generated by taking a sum of the weighted encoded hidden states 415a-c.

A decoded hidden state for the current timestamp (t) 410b is computed through the use of a non-linear activation function 416. The non-linear activation function 416 may be an LSTM or a GRU or other suitable activation function. The decoded hidden state for the current timestamp (t) 409b is computed with reference to the context vector 417, the decoded hidden state from the previous timestamp (t−1) 410a, and an output from the previous timestamp (t−1) 412a.

The decoded hidden state for the current timestamp (t) 410b produces an output for the current timestamp (t) 412b. The relationship between input and output for an unknown non-linear function F is thus approximated. The approximation may be used to generate a predicted output $\hat{y}_T$ according to Formula (5) below:

$$\hat{y}_T = v_o^T(W_o[d_T; c_T] + b_w) + b_v$$ Formula (5)

where $v_o^T$ is a concatenation of the weights, $[d_T; c_T]$ is a concatenation of the decoder hidden state and the context vector, $W_o$ and $b_w$ are parameters to be learned to map the concatenation to the size of the decoded hidden states and $b_v$ is a bias to be learned.

Figure 5:
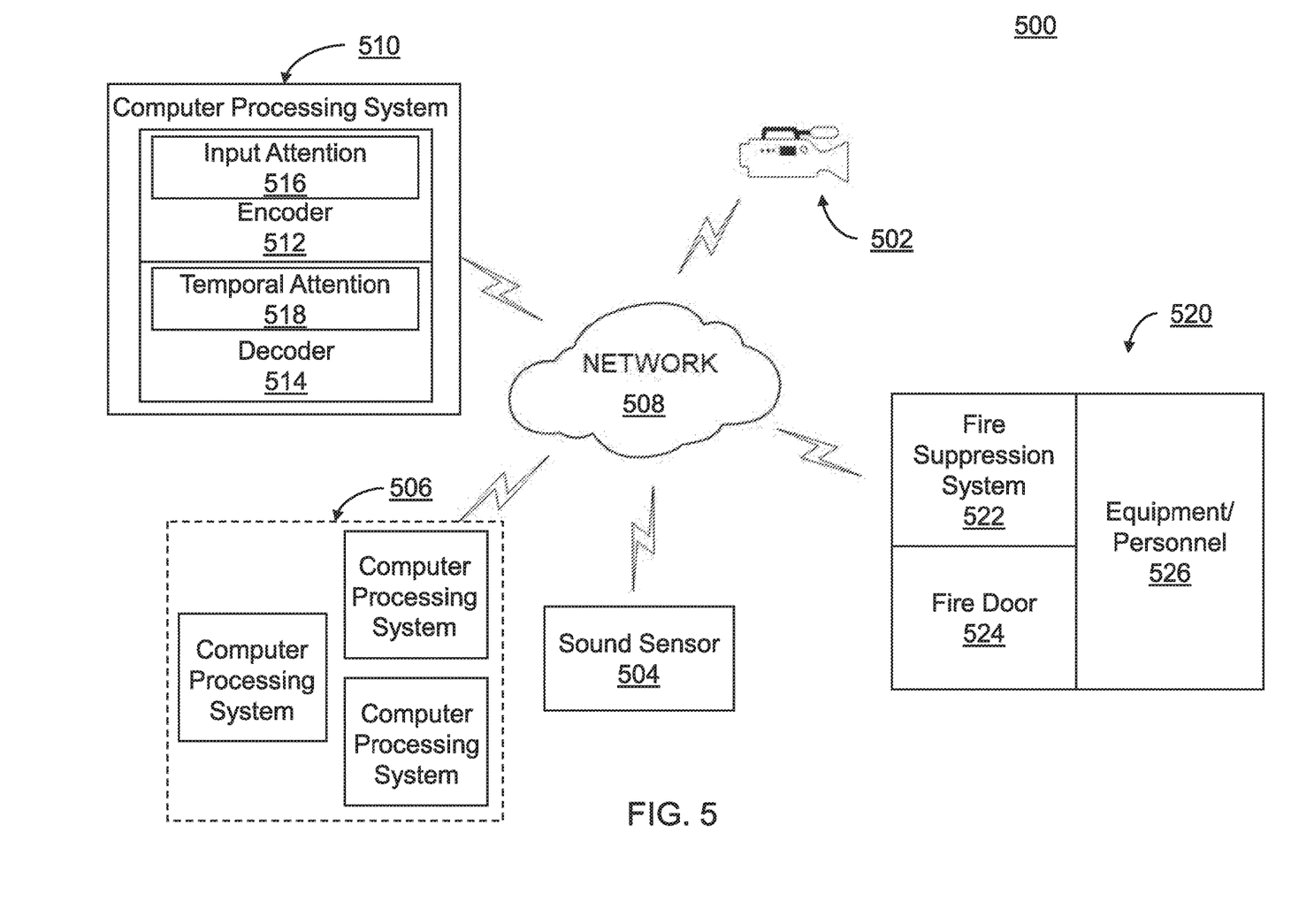
FIG. 5 is a schematic illustrating a dual-stage attention-based recurrent neural network (DA-RNN) hazardous anomaly detection system including a fire suppression system, in accordance with an embodiment of the present invention.

Referring now to FIG. 5, a block diagram of an exemplary embodiment of a video workplace safety system 500 is shown. The workplace safety system 500 is representative of a computer network to which aspects of the present invention can be applied. The elements shown relative to FIG. 5 are set forth for the sake of illustration. However, it is to be appreciated that the present embodiments can be applied to other network configurations and other operational environments as readily contemplated by one of ordinary skill in the art given the teachings provided herein.

The workplace safety system 500 includes an imaging sensor 502 such as a video camera, a computer processing system or server 510, a plurality of computer processing systems or servers 506 and a sound sensor 504. The workplace safety system 500 further includes a workplace environment 520 including at least one safety system or device 522 such as a fire suppression system, a controlled system (s), machine(s), and/or device(s) (individually and collectively denoted by the reference numeral 524 and hereinafter referred to as "controlled system, machine, and/or device") and other equipment and personnel 526. For the sake of simplicity and illustration, the preceding elements are shown in singular form, but can be readily extended to more than one of any of the preceding elements as readily appreciated by one of ordinary skill in the art given the teachings of the present invention provided herein. The computer processing system 510 can be any type of computer processing system including, but not limited to, servers, desktops, laptops, tablets, smart phones, media playback devices, and so forth, depending upon the particular implementation. For the sake of illustration, the computer processing system computer processing system is a server.

The imaging sensor 504 is configured to capture one or more video sequences that are processed by the computer processing system 510. The computer processing system 510 is configured to perform dual-stage attention based deep learning using a dual-stage attention-based recurrent neural network (DA-RNN) with auxiliary tasks for video-based anomaly detection. By employing, a dual attention system as described herein, greater accuracy and speed can be achieved for identifying events in a security environment. The computer processing system 510 is configured to form observations by identifying and tracking a subject (e.g.; personnel, conditions, equipment, etc.), actions by the subject, and objects on which the actions are taken. The computer processing system 510 then generates a set of driving series from the observations through time.

The DA-RNN of the computer processing system 510 is configured, through training, to apply input attention using an input attention mechanism 516 to adaptively extract relevant observations of the driving series for encoding with an encoder 512. Upon extraction, the observations are then encoded into hidden states. The hidden states are then extracted using temporal attention with a temporal attention mechanism 518, at which point they are then decoded using a decoder 514. The decoded information is then used to generate predictions of future actions of the subject that is both accurate and efficient. As a result, when the observations include an anomaly that may pose a safety risk (e.g., hazard or safety risk to personnel or equipment), the computer processing system 510 including the DA-RNN will predict the safety risk upon processing the anomaly.

Moreover, the computer processing system 510 is configured to perform an action (e.g., a control action) on the controlled system, machine, and/or device 524 responsive to detecting the anomaly corresponding to the safety risk. Such action can include, but is not limited to, one or more of: powering down the controlled system, machine, and/or device 522 or a portion thereof; powering down, e.g., a system, machine, and/or a device that is affected by another device, opening a valve to relieve excessive pressure, locking an automatic fire door, and so forth. As is evident to one of ordinary skill in the art, the action taken is dependent upon the type of anomaly and the controlled system, machine, and/or device 524 to which the action is applied.

The safety system or device 522 can implement the aforementioned or other action. The safety system or device 522 can be a shut off switch, a fire suppression system, an overpressure valve, and so forth. As is readily appreciated by one of ordinary skill in the art, the particular safety system or device 522 used depends upon the particular implementation to which the system 500 is applied. Hence, the safety system or device 522 can be located within or proximate to or remote from the controlled system, region or area, machine, and/or device 524, depending upon the particular implementation.

The DA-RNN adaptively extracts observations relevant to the hazardous anomaly by using dual-stage attention mechanisms. By adaptively extracting the relevant observations, and thus the relevant feature series from, for example, safety system videos, the dual-stage attention mechanisms of the DA-RNN can ensure the most relevant information is processed. A safety system or device 522 that is controlled by a DA-RNN not only improves prediction accuracy through accurate feature series extraction, but it also improves the capture of long-term dependencies and reduction in noise.

In the embodiment shown in FIG. 5, the elements thereof are interconnected by a network(s) 508. In particular, the network 508 is depicted as a wireless network. However, in other embodiments, other types of connections (e.g., wired, etc.) can also be used. Additionally, one or more elements in FIG. 5 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of workplace safety system 500 are readily determined by one of ordinary skill in the art, given the present teachings provided herein.

Figure 6:
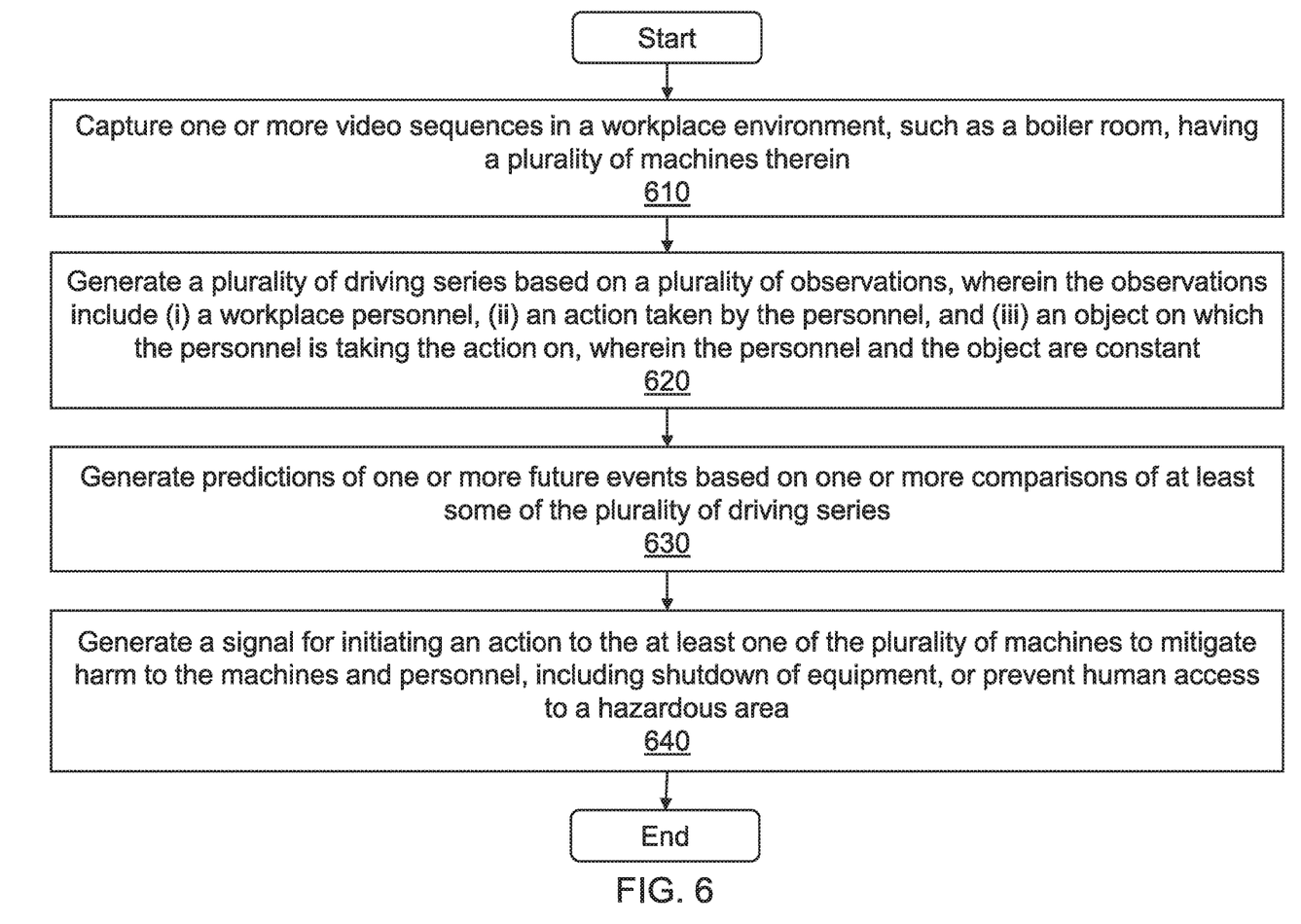
FIG. 6 is a block/flow diagraph illustrating a DA-RNN to predict a hazardous workplace environments a take action to mitigate harm, in accordance with an embodiment of the present invention.

Referring to FIG. 6, an example of workplace safety system operation is illustratively shown. The DA-RNN is deployed within an industrial facility and is trained to monitor hazardous conditions. In particular, in power generation facilities utilizing fossil fuel boilers, the DA-RNN is deployed to monitor the boiler room personnel and to take immediate action, based on observed personnel actions, to prevent harm to human life or significant property damage. The monitoring system is operated by the DA-RNN and captures one or more video sequences in a workplace environment, such as a boiler room, having a plurality of machines therein (refer to these as block in flow chart or block diagrams) 610. The DA-RNN is trained to generate a plurality of driving series based on a plurality of observations, wherein the observations include (i) a workplace personnel, (ii) an action taken by the personnel, and (iii) an object on which the personnel is taking the action on, wherein the personnel and the object are constant 620 and, thereafter, generate predictions of one or more future events based on one or more comparisons of at least some of the plurality of driving series 630. Based on the predictions, the DA-RNN will take automatic action to mitigate harm to the machines and personnel, including shutdown of equipment, or prevent human access to a hazardous area 640. Automatic actions can include shutting down a boiler or furnace, automatic shutdown of equipment or preventing human access to hazardous areas.

Figure 7:
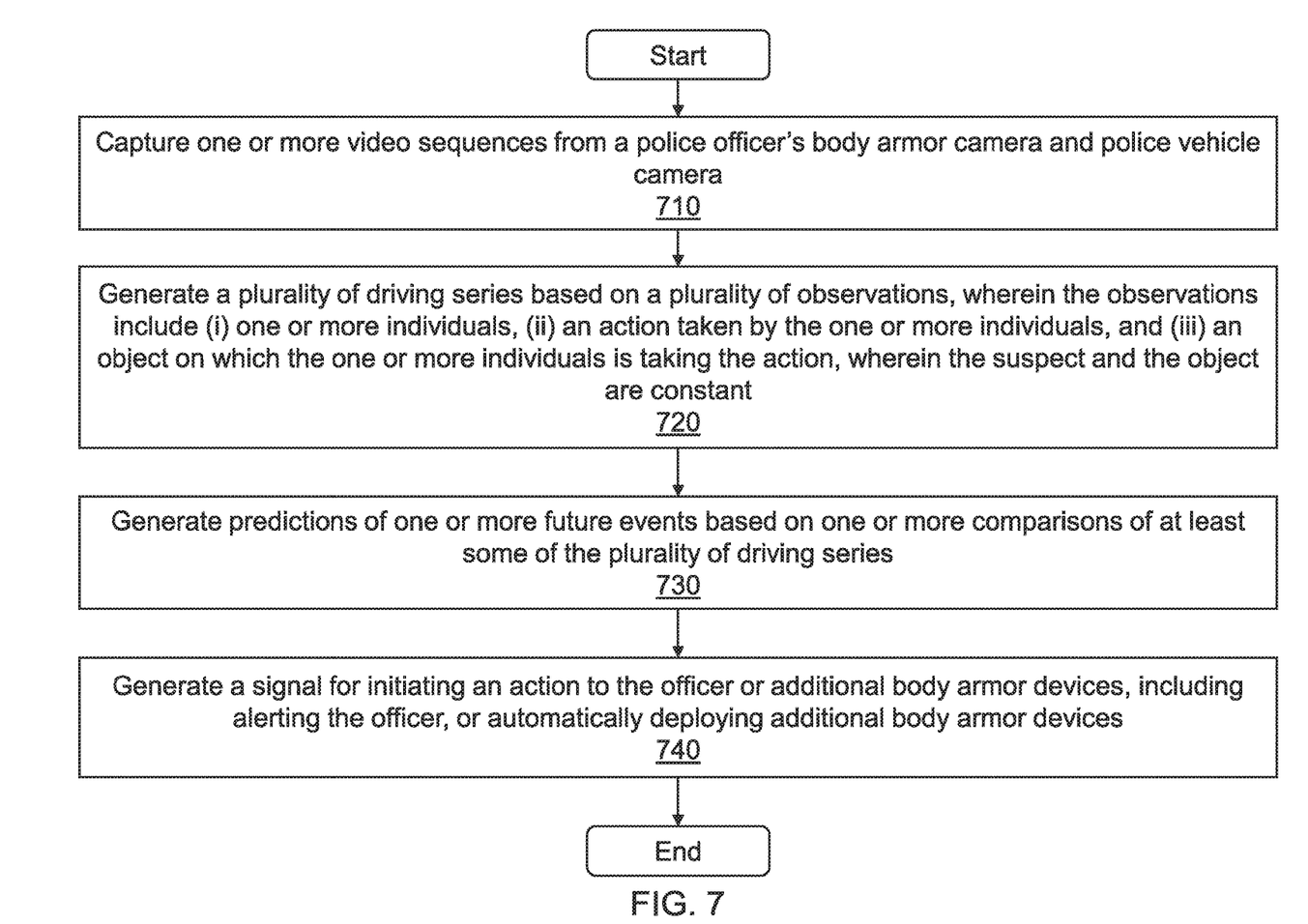
FIG. 7 is a block/flow diagraph illustrating a DA-RNN to predict a police suspects actions and protect a police officer, in accordance with an embodiment of the present invention.

In another embodiment as illustrated in FIG. 7, the DA-RNN is deployed as an automatic police safety protection system. The police safety protection system is operated by the DA-RNN and receives image data from the police officer's body armor camera and police vehicle camera 710. The DA-RNN is trained to predict future events based on actions of an individual or individuals 730 by generating a plurality of driving series based on a plurality of observations, including observations of (i) one or more individuals, (ii) an action taken by the one or more individuals, and (iii) an object on which the one or more individuals is taking the action 720. The DA-RNN is configured to automatically mitigate a health or safety risk to the police officers based upon the predictions of the DA-RNN. Automatic actions can include deploying additional body armor devices for the police officers, alerting police officers of the predicted event, and providing annunciation of the predicted event at remote locations 740.

In another embodiment, the DA-RNN is deployed in police hostage negotiation situations, wherein the DA-RNN is trained to predict the likelihood of future events given the immediate actions of an individual. The DA-RNN learns to predict the occurrence of future events, and is automatically configured to take immediate action to ensure safety. Automatic actions taken can include automatically securing magnetic door locks in a facility, alerting police officers of the predicted event, and providing annunciation of the predicted event at remote locations.

Other environments in which to deploy a DA-RNN based video safety system, as described above, are contemplated. For example, to maintain security at public or private events, to maintain security in stores, and to maintain safety during recreational activities.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for time series prediction, comprising:
    encoding a plurality of driving series into a plurality of encoded hidden states, the encoding including adaptively prioritizing driving series at each of a plurality of timestamps using input attention, the plurality of driving series including data sequences collected from one or more sensors;
    decoding the plurality of encoded hidden states to generate a predicting model, the decoding including adaptively prioritizing encoded hidden states using temporal attention, the encoded hidden states being received and extracted using dual distinct attention mechanisms, the dual distinct attention mechanisms including an input attention mechanism and a temporal attention mechanism for the input attention and the temporal attention, respectively;
    generating predictions of one or more future events using the predicting model based on the data sequences; and
    generating a signal for initiating an action to at least one device based on the predictions.

2. The method as recited in claim 1, wherein the one or more sensors include imaging sensors; and
    the data sequences include video sequences.

3. The method as recited in claim 1, wherein the data sequences include subjects and objects tracked in a video; and
    the predictions include hazards arising from actions of the subjects and objects.

4. The method as recited in claim 1, wherein applying input attention includes setting input attention weights for each input feature of the plurality of driving series with a deterministic attention model; and
    updating the encoded hidden state with the input attention weights.

5. The method as recited in claim 1, wherein the applying temporal attention includes setting temporal attention weights for each encoded hidden state with a deterministic attention model; and
    updating the encoded hidden state with the temporal attention weights.

6. The method as recited in claim 1, wherein the applying temporal attention includes setting temporal attention weights to each encoded hidden state and computing a context vector from a weighted sum of the encoded hidden states.

7. The method as recited in claim 1, wherein the decoding includes computing decoder hidden states using the context vector in a non-linear activation function.

8. The method as recited in claim 1, wherein encoding further includes a non-linear activation function including one of a Long Short-Term Memory Unit or a Gated Recurrent Unit.

9. The method as recited in claim 1, wherein decoding further includes a non-linear activation function including one of a Long Short-Term Memory Unit or a Gated Recurrent Unit.

10. The method as recited in claim 1, wherein the predicting model generates a predicted output $\hat{y}_T$ by calculating $\hat{y}_T = V_o^T (W_o [d_T; c_T] + b_w) + b_v$, where $V_o^T$ is a concatenation of weights, $[d_T; c_T]$ is a concatenation of a decoder hidden state and a context vector, $W_o$ and $b_w$ are parameters learned to map a concatenation to a size of the decoded hidden state, and $b_v$ is a learned bias.

11. A system for time series prediction, comprising:
    at least one imaging sensor configured to capture one or more video sequences;
    an encoder configured to encode a plurality of driving series into a plurality of encoded hidden state using an input attention mechanism configured to adaptively prioritize driving series at each of a plurality of timestamps, wherein the plurality of driving series includes the video sequences; and
    a decoder configured to decode the at least one encoded hidden state with a non-linear activation function to predict a future state using a temporal attention mechanism configured to adaptively prioritize encoded hidden states, the encoded hidden states being received and extracted using dual distinct attention mechanisms, the dual distinct attention mechanisms including an input attention mechanism and a temporal attention mechanism for the input attention and the temporal attention, respectively; and
    a computer processor configured to:
        generate predictions of one or more future events based on the encoding and decoding of the video sequences; and
        generate a signal for initiating an action to at least one device based on the predictions.

12. The method as recited in claim 11, wherein the plurality of driving series include subjects and objects tracked in a video; and
    the predictions include hazards arising from actions of the subjects and objects.

13. The system as recited in claim 11, wherein the input attention mechanism includes a deterministic attention model configured to set input attention weights for each input feature of the driving series and updating the encoded hidden state with the input attention weights.

14. The system as recited in claim 11, wherein the input attention mechanism includes a feed-forward network.

15. The system as recited in claim 11, wherein the encoder includes a recurrent neural network for encoding the driving series.

16. The system as recited in claim 11, wherein the decoder includes a recurrent neural network for decoding the encoded hidden states.

17. The system as recited in claim 11, wherein the temporal attention mechanism includes a deterministic attention model configured to set temporal attention weights for each encoded hidden state and updating the encoded hidden states with the temporal attention weights.

18. The system as recited in claim 11, wherein the temporal attention mechanism in configured to set temporal attention weights for each encoder hidden state and compute a context vector from a weighted sum of the encoded hidden states.

19. The system as recited in claim 18, wherein the decoder is configured to compute decoded hidden states using the context vector in a non-linear activation function.

20. The system as recited in claim 11, wherein the predicting a future state generates a predicted output $\hat{y}_T$ by calculating $\hat{y}_T = V_o^T (W_o [d_T; c_T] + b_w) + b_v$, where $V_o^T$ is a concatenation of weights, $[d_T; c_T]$ is a concatenation of a decoder hidden state and a context vector, $W_o$ and $b_w$ are parameters learned to map a concatenation to a size of the decoded hidden state, and $b_v$ is a learned bias.

\* \* \* \* \*